United States Patent [19]
Hull et al.

[11] Patent Number: 5,497,733
[45] Date of Patent: Mar. 12, 1996

[54] ANIMAL CONTROL, TRAINING APPARATUS AND METHOD OF USE

[76] Inventors: Harold L. Hull, 401 Canyon Way #43, Sparks, Nev. 89434; Curt D. Torvick, P.O. Box 8140, Reno, Nev. 89507

[21] Appl. No.: 270,477

[22] Filed: Jul. 5, 1994

[51] Int. Cl.$^6$ ................................................ A01K 27/00
[52] U.S. Cl. ............................................. 119/793; 119/864
[58] Field of Search .................................. 119/792, 793, 119/795, 797, 821, 858, 864

[56] References Cited

U.S. PATENT DOCUMENTS

| | | |
|---|---|---|
| 188,043 | 3/1877 | Elmore . |
| D. 270,488 | 9/1983 | Erdmann .................. D30/38 |
| D. 289,454 | 4/1987 | Taub ......................... D30/38 |
| D. 291,942 | 9/1987 | Green ....................... D2/628 |
| D. 306,504 | 3/1990 | Young . |
| D. 330,173 | 10/1992 | Juliana et al. ............ D10/106 |
| D. 337,395 | 7/1993 | Erlinger et al. .......... D30/153 |
| 3,095,857 | 7/1963 | Fisher . |
| 3,332,398 | 7/1967 | Mintz . |
| 4,019,463 | 4/1977 | Kitchen ..................... 119/793 |
| 4,178,879 | 12/1979 | Cunningham ............. 119/858 |
| 4,218,991 | 8/1980 | Cole ....................... 119/156 X |
| 4,321,891 | 3/1982 | Moeller . |
| 4,328,767 | 5/1982 | Peterson ................... 119/794 |
| 4,584,967 | 4/1986 | Taplin ....................... 119/793 |
| 4,676,198 | 6/1987 | Murray . |
| 4,774,801 | 10/1988 | Johansen ...................... 54/34 |
| 4,841,915 | 6/1989 | Rocchetti ................. 119/864 |
| 4,879,972 | 11/1989 | Crowe et al. . |
| 4,887,552 | 12/1989 | Hayden ..................... 119/793 |
| 4,917,049 | 4/1990 | Peterson . |
| 4,996,948 | 3/1991 | Klein ........................ 119/864 |
| 5,005,527 | 4/1991 | Hatfield ..................... 119/793 |
| 5,099,799 | 3/1992 | Giacobbe .................. 119/793 |
| 5,146,876 | 9/1992 | McPhail .................... 54/34 X |
| 5,355,839 | 10/1994 | Mistry ...................... 119/858 |
| 5,363,809 | 11/1994 | Roe .......................... 119/792 |

FOREIGN PATENT DOCUMENTS

| | | |
|---|---|---|
| 125879 | 3/1901 | Germany .................. 119/864 |
| 461102 | 6/1928 | Germany . |
| 859856 | 1/1961 | United Kingdom ..... 119/793 |
| 2109215 | 6/1983 | United Kingdom ..... 119/793 |
| 2188524 | 10/1987 | United Kingdom ..... 119/858 |
| 8501857 | 5/1985 | WIPO ....................... 119/793 |

OTHER PUBLICATIONS

"Bungee Pup" brochure, c/o Steve Trudeau, President, Bungee Pup, 1470 grand Ave., Suite D, San Diego, CA 92109 (619) 483–9160.

*Primary Examiner*—Robert P. Swiatek
*Attorney, Agent, or Firm*—Cushman Darby & Cushman

[57] ABSTRACT

A combination animal choke collar and least which includes an elongated, continuous member having a grasping portion on one of its ends, its opposite end being folded upon itself and fastened so as to form a loop which captures a rectangular frame. The handle portion when drawn through the rectangular frame forms a loop which is used as a choke collar and provides a second position. A first, position is provided when the choke collar is in place around the animal's neck, and the leash portion of the member is wrapped around upon itself and held secure by a loop and pile fastener such as VELCRO (tm). This device can be worn by the animal at all times when in its first position and when a person desires control over the animal they simply give a gentle tug on the grasping portion and the device assumes its second position. Also included is a pocket which receives and protects valuable documents such as identification papers pertaining to the animal. Also the device may include a roller around one leg of the square frame to reduce friction and abrasion on the strap and a choking member may be included in the form of one-half of a rubber ball which lies against the wind pipe the animal when the device is in a leash or second position.

14 Claims, 3 Drawing Sheets

5,497,733

ANIMAL CONTROL, TRAINING APPARATUS AND METHOD OF USE

FIELD OF THE INVENTION

This invention relates to animal restraint devices and more particularly to a combination animal leash, collar and pocket for an identification tag.

BACKGROUND OF THE INVENTION

The problem of animal control such as the control of dogs, pet lions, tigers, cheetahs, etc. or the like, is one that has been addressed over many years with a variety of commonly used collars and snap-on leashes. In recent years, due to the increase of leash laws and ordinances now in place or being considered, a need exists for a combination collar and leash which not only is comfortable to the animal but is readily accessible to the person responsible for the animal with the leash being part of the collar. A combination of collar and leash has been proposed by U.S. Pat. 4,328,767 and U.S. Pat. 4,584,967, however, the '767 reference is a complicated apparatus which is bulky and uncomfortable to the animal and involves an expensive retraction mechanism, while the '967 reference involves a buckle apparatus with the buckle tongue against the dogs neck and VELCRO (tm) or a pouch is required to keep the leash in place. Also, no choker collar combination with a leash and/or identification means is taught.

SUMMARY OF THE INVENTION

It is a primary object of the present invention to provide a combination animal choke collar and leash which may be retained in a first collar position or may be used in a second position as a combination leash and collar.

It is a further object to make a collar and leash combination without the use of a buckle.

Another object is to hold the leash in a first position around the collar by fastening means of the loop and pile variety such as VELCRO (tm).

Yet another important object is to provide a substantially square shaped frame which may be captured by one end of the nylon strap collar and which the opposite end of the nylon strap may be threaded thru, thus providing a comfortable and friendly choke strap leash and collar arrangement.

Yet another object is to provide a roller around one of the legs of the square frame to reduce friction when pulling on the animal and to reduce abrasion on the strap.

Still another object is to make the collar and leash in one continuous length made from a material such as nylon strapping.

Another object is to provide a loop on the second end of the leash for grasping by the user which is held in a secure manner by snaps, however if the user wishes to shorten or lengthen the leash, we have provided a second set of snaps so as to allow the user a choice of two positions for either a long or short leash.

Still another object is to provide a pocket attached to the leash or collar into which identification indicia may be placed such as ownership papers, licenses, dog tags, etc.

Another important object is to provide a collar and leash which stays on the animal at all times unless removed by a person.

Still another important object is to provide the collar and leash combination in such a manner that when the is grasped by the hand of a person the collar and leash "rotates" from its first position around the animal's neck a comfortable manner until it reaches its leash choke collar, second position.

Yet another object is to provide a leash and choke collar which does not harm the animal as a "choke chain" does but still maintains positive control over the animal.

Another object is to make a collar and leash combination which cooperates together to provide a minimum amount of noise under conditions such as stalking or hunting.

Still another object is to make the collar and leash only two or three possible sizes as the principle will allow its use with many various sized animals.

Another object is to provide a collar and leash combination to enable a small person or even a child to control a large animal by creating pressure on the wind pipe the animal when the device is in its second position.

Yet another important object is to provide a means to exert pressure on the esophagus or wind pipe of the animal to cut off the wind supply momentarily without undue pressure on the neck such as in the form of half a rubber ball which includes removable means to attach to the leash at a position substantially over the wind pipe of the animal.

Still another object is to teach a method of use for the apparatus.

Other objects and advantages will become apparent when taken into consideration with the following drawings and specifications.

DETAILED DESCRIPTION OF THE DRAWINGS

Figure 1:
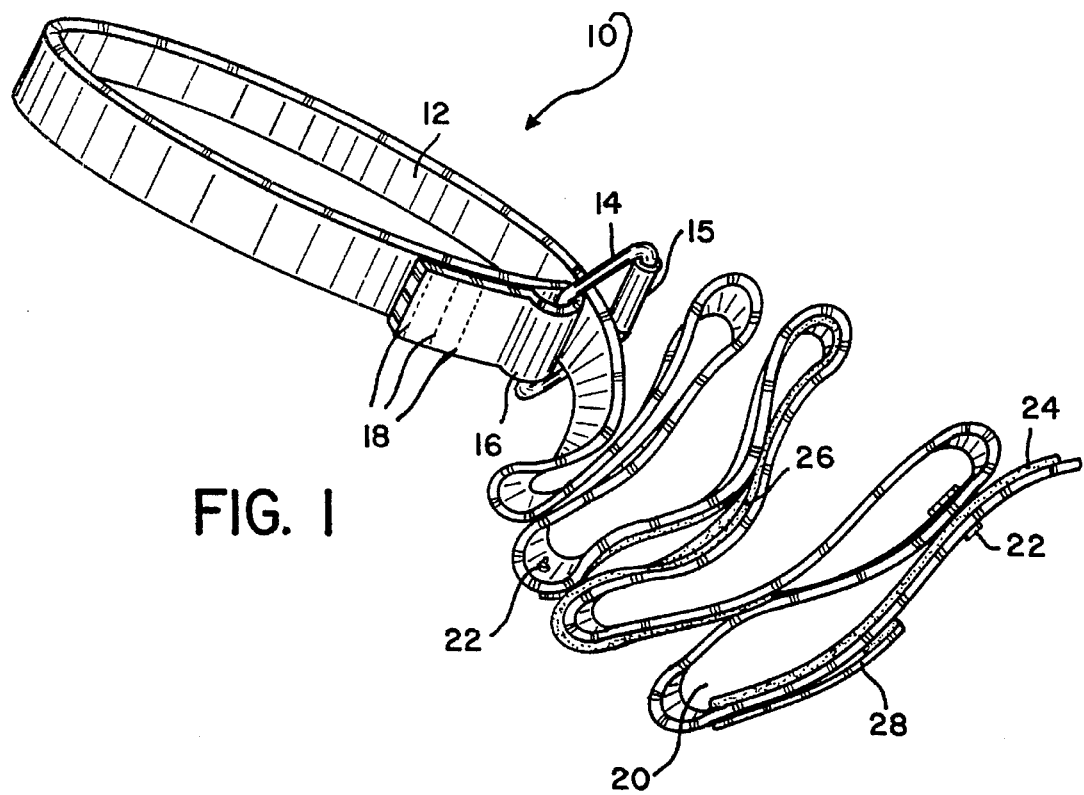
FIG. 1, is a perspective view.
Figure 2:
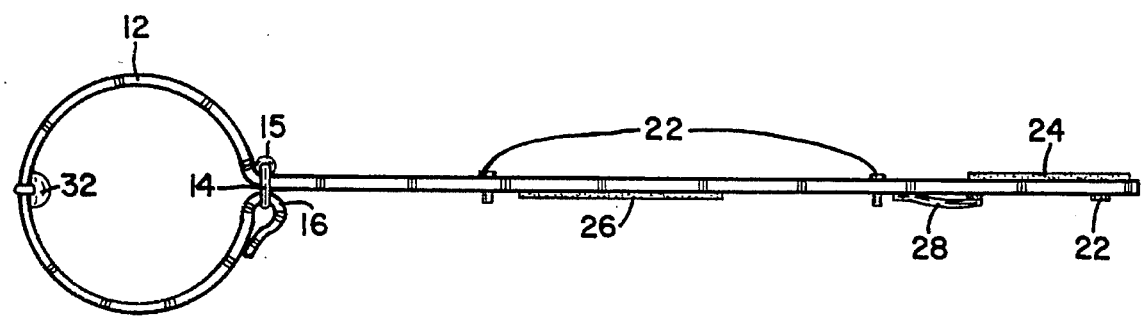
FIG. 2, is a side view with the leash extended to a second position.
Figure 3:
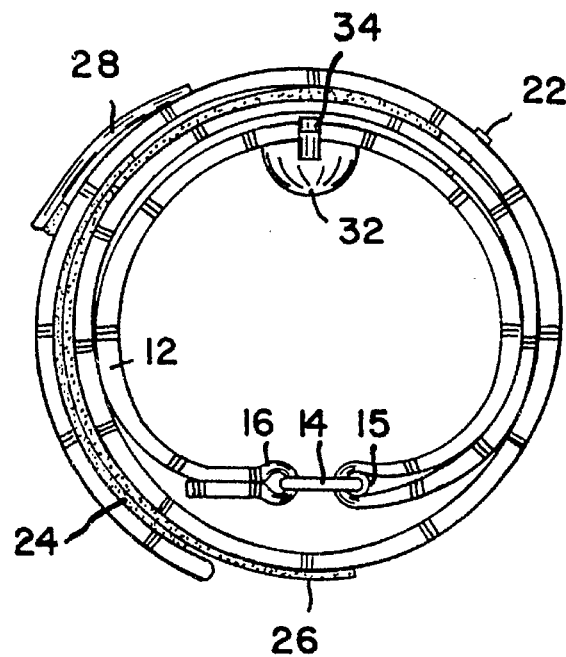
FIG. 3, is a side view showing the collar and leash in a closed first position.

Referring now to the drawings wherein like characters refer to like elements throughout the various drawings. Shown in FIG. 1, 10 is an over view of the present invention with 12 being an elongated, continuous, flexible, flat first member, such as a strap having a first and second end and a first and second position. The first position forming a coiled collar around an animal's neck as shown in FIG. 3, while its second position forms a collar and leash when extended as shown in FIG. 2. The strap 12 may be made from any suitable material such as Nylon or the like and is of a sufficient length to form a collar and a leash in combination. A second member is shown having a rim surrounding a cavity with the cavity being of a size and shape to accept the first member 12 and the second member being a means to affix the first member 12 to the second member such as substantially a rectangular or square frame or link member 14 which may be made of metal. The first and second members have a sliding relationship with the sliding relationship being between the second member and substantially an intermediate portion of the first member between the first and second ends thereof which passes through the cavity of the second member. 15 being a roller around one leg of the square frame 14 and 16 being a loop on the first end of strap 12 which captures one side of the square frame 14 and may be fastened to itself by sewing 18 or rivets (not shown).

Figure 4:
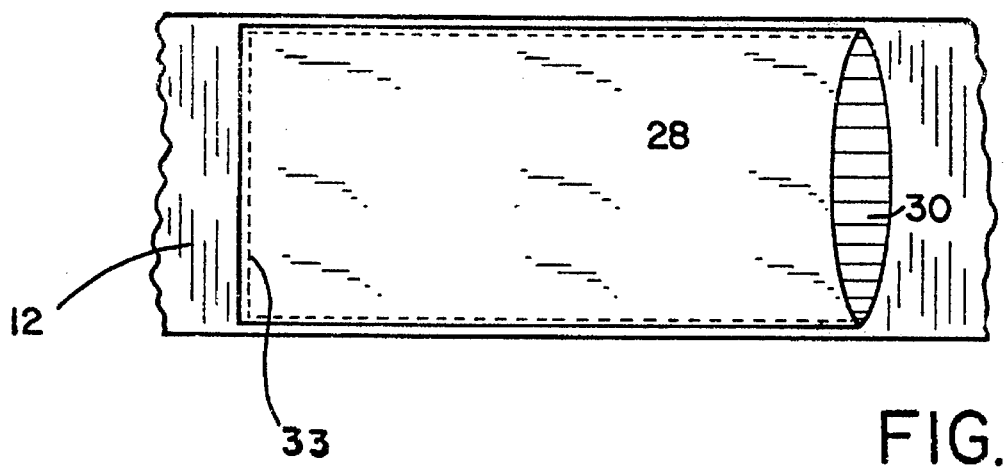
FIG. 4, is a perspective view showing one embodiment of an indicia holding pouch.
Figure 5:
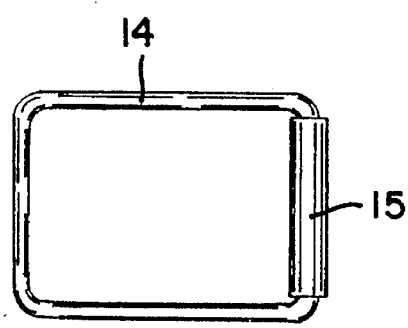
FIG. 5, is an enlarged frontal view of a square frame and roller.
Figure 6:
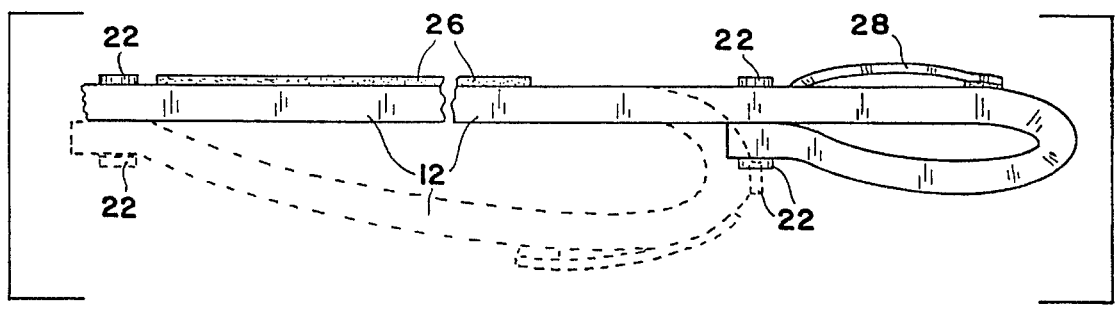
FIG. 6, is a partial enlarged view of the second end of the leash which shows a first position for the loop or grasping means with a second position shown in ghost lines.
Figure 7:
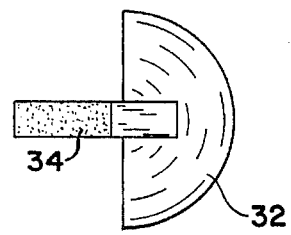
FIG. 7, is an enlarged side view of the preferred embodiment of a choking member.

The second end of strap 12 includes a grasping means which is affixed to the second end of strap 12 such as loop 20 which is secured to itself by fastening means such as first and second snaps 22 which are positioned at variable places on strap 12 so as to allow the loop 20 adjustable length and a first and second position. The first position allowing the first member 12 to have a first adjustable length, the second position allowing the first member 12 to have a second adjustable length which is less than said first adjustable length whereby, the first snap removably affixing the grasping means in its first position and the second snap removably affixing the grasping means in its second position, thus loop 20 acts as an adjustable handle or grasping means for the user. 24 is one side of a fastening means of the loop and pile variety such as VELCRO (tm) which is suitably attached to substantially the second end of strap 12 which mates with the mating side of the fastener 26 and 26 being suitably affixed to the strap 12, therefore fastening means 24 and 26 cooperate together to provide means to releasably hold the first member 12 in its closed first position, thereby exposing the grasping means 20 on the second end of member 12. It is not necessary to have one side of the collar totally covered with VELCRO (tm) as the junction point is small in area. In FIG. 4, 28 is a pocket which may have an opening 30 which is of a size and shape to hold and secure identification papers and documents pertaining to the animal such such as ownership papers, dog tags or the like. Pocket 28 is suitably affixed such as by stitching 33 to the strap 12 and is located at a position of engineering choice. In FIG. 7, 32 is a removable, adjustable choking member in the form of a protrusion, such as ½ of a rubber ball which is removably affixed to strap 12 by fastener means such as a clip or at least two straps 34 which are of a sufficient length to capture strap 12 when positioned thereon and straps 34 are positioned substantially around strap 12 and held in a secure manner by VELCRO 36, therefore when rubber ball 32 is in its choker position, it lies against the wind pipe of the animal to apply pressure to the wind pipe of the animal when a pull is exerted on the handle 20 of strap 12.

It will now be seen that we have provided a combination collar, leash and identification pocket that when in its first position is a comfortable collar with the identification pocket showing and a grasping portion easily available which when snapped back on itself forms a handle.

It will also be noted that when the grasping portion is grasped by a person that the fastening means such as VELCRO (tm) easily releases and the collar rotates around the animal's neck until the leash reaches its extended second position and then the collar becomes a "choke" collar to control the animal without the "choke" collar harming the animal as the protrusion cuts off the wind pipe temporarily, thus making the animal uncomfortable without putting undue stress and pressure on the neck of the animal.

It will further be seen that we have provided a method of controlling and training an animal which comprises;

a. Attaching a combination choke collar and leash around the neck of an animal;

b. wrapping the leash portion around the choke collar;

c. affixing the leash portion to the choke collar portion in a removably secure manner;

d. exposing an end of the leash to form a grasping portion;

e. grasping the grasping portion of the exposed end of the leash;

f. pulling on the leash to uncoil the leash portion from the collar portion and g. pulling on the leash to tighten the choke collar sufficiently to discourage the animal from pulling unduly against the leash and choke collar.

It is a further object to provide the method as described above with a further step between steps C and D comprising; Positioning and removably attaching a choking member.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by Letters Patent is:

1. An animal control device comprising:

an elongated flexible flat member being of sufficient length to form a collar and a leash, said flexible flat member having first and second opposite surfaces, said flexible flat member adapted to assume two different position including a first position wherein said flexible flat member is wrapped substantially completely upon itself around an animal's neck to form a collar and a second position wherein said flexible flat member has a generally forward portion thereof forming a choke collar wrapped around an animal's neck and a generally rearward portion thereof forming a leash extending away from the animal's neck to be manually grasped by an individual;

a link member secured to one end portion of said flexible flat member and defining an opening through which said flexible flat member is received;

said flexible flat member constructed and arranged so as to be able to extend from said one end portion thereof around an animal's neck and through said opening in said link member so that a forward portion of said first surface of said flexible flat member between said one end portion and a portion of said flexible flat member that extends through said opening is adapted to be substantially disposed in engagement with said animal's neck, said flexible flat member constructed and arranged to be folded back on itself generally at the portion thereof that extends through said opening in said link member so that a forward portion of said second surface of said flexible flat member between said one end portion and the portion of the flexible flat member that extends through said opening is engaged by more rearward portions of said second surface than said forward portion of said second surface when said flexible flat member forms said collar in said first position;

a first fastener means disposed on said first surface of said flexible flat member at least at an intermediate portion of said flexible flat member so as to face outwardly away from the animal's neck when the flexible flat member is disposed around the animal's neck and folded back on itself to form the collar in the first position as aforesaid; and a second fastener means disposed on said second surface of said flexible flat member at least at a portion of said flexible flat member disposed more rearwardly than said first fastener means and adapted to be brought into engagement and secured with said first fastener means when said flexible flat member is completely wrapped around the animal's neck while being folded back on itself to form the collar in the first position as aforesaid, said flexible flat member being manually movable from said first position to said second position by an individual grasping said rearward portion of the flexible flat member in said first position and unsecuring said second fastener means from said first fastener means and subsequently pulling said rearward portion so that said flexible flat member spins around the animal's neck until it assumes the second position as said leash and choke collar.

2. The animal control device of claim 1 in which said link member has a substantially rectangular shape.

3. The animal control device of claim 1 far in which said link member is secured to said one end portion of said flexible flat member by a forward edge of said flexible flat member being looped through said link member and sewn to an adjacent portion of said flexible flat member.

4. The animal control device of claim 1 in which said rearward portion of said flexible flat member is adapted to be formed into a loop configuration and retained in said loop configuration by fastening means, said loop arrangement serving to facilitate manual grasping of said rearward portion of said flexible flat member.

5. The animal control device of claim 4 in which said fastening means is a snap arrangement.

6. The animal control device of claim 4 in which said fastening means comprises a first snap member disposed at a rearward end of said flexible flat member and a pair of spaced second snap members disposed at different intermediate portions of said flexible flat member, said first snap member being selectively connectable with one of said second snap members to enable said choke collar and leash to be selectively provided with different length loop arrangements to be grasped by an individual.

7. The animal control device of claim 1 in which said first and second fastener means is in the form of a loop and pile fastener arrangement.

8. The animal control device of claim 1 further comprising a pocket affixed to said flexible flat member, said pocket being of a size and shape to hold and secure identification papers and documents pertaining to said animal.

9. The animal control device of claim 1 wherein said link member has a rectangular configuration including one leg to which said one end portion of said flexible flat member is fixed and an opposite leg having a roller provided therearound to facilitate movement of said flexible flat member through said opening in said link member when said rearward portion of said flexible flat member is manually grasped and pulled to apply a choking force around an animal's neck.

10. The animal control device of claim 1 including a choking member removably affixed to said forward portion of said flexible flat member, said choking member being adjustable on said choke collar to lie against a windpipe of an animal when said choke collar and leash assumes said second position.

11. The animal control device of claim 10 in which said choking member is in the form of one-half of a rubber ball.

12. The animal control device of claim 10 in which said choking member is removably affixed to said choke collar by second loop and pile fastener means.

13. A method of using an animal control device comprising the steps of:

providing a forward portion of a flexible elongated member around the neck of an animal, said forward portion having one end portion thereof secured to a link member and extending from said one end portion around the neck of the animal in a first direction and through an opening defined by said link member;

wrapping a rearward portion of the elongated member extended through said opening in said link member in a direction opposite said first direction so that said elongated member is folded back upon itself, and continuing said wrapping until an entire length of said rearward portion is wrapped around the animal's neck;

securing an end portion of said flexible elongated member opposite said one end portion of said flexible elongated member to other portions of said flexible elongated member previously wrapped around the animal's neck;

grasping said flexible elongated member generally in the vicinity of said end portion thereof so as to unsecure said end portion from said portions of said flexible elongated member previously wrapped in said opposite direction around the animal's neck; and pulling said rearward portion of said flexible elongated member generally in the vicinity of said end portion so as to cause said flexible elongated member to spin and thereby uncoil around the animal's neck and so that continued pulling causes tensioning of said forward portion around the animal's neck.

14. The method of using an animal control device of claim 13 further including an additional step of positioning and removably attaching a choking member to said forward portion of said flexible elongated member to facilitate choking of said animal when tensioning of said forward portion around the animal's neck is applied.

* * * * *